S. A. STRICKLAND.
PUMP.
APPLICATION FILED OCT. 30, 1916.

1,315,257.

Patented Sept. 9, 1919.

Witnesses
Arthur F. Draper
Chas. W. Stauffer

Inventor
Silas A. Strickland
By
Attorneys

UNITED STATES PATENT OFFICE.

SILAS A. STRICKLAND, OF DETROIT, MICHIGAN, ASSIGNOR TO DETROIT ACCESSORIES CORPORATION, OF DETROIT, MICHIGAN, A CORPORATION OF MICHIGAN.

PUMP.

1,315,257. Specification of Letters Patent. Patented Sept. 9, 1919.

Application filed October 30, 1916. Serial No. 128,440.

*To all whom it may concern:*

Be it known that I, SILAS A. STRICKLAND, a citizen of the United States of America, residing at Detroit, in the county of Wayne and State of Michigan, have invented certain new and useful Improvements in Pumps, of which the following is a specification, reference being had therein to the accompanying drawings.

This invention relates to devices of the class shown in my Letters Patent No. 1,150,977 of August 24, 1915, for detachably connecting a pump to the motor of a vehicle and rigidly and detachably supporting and holding the same in operative position, so that it may be quickly applied for use and may be readily detached and stored in the tool box of the vehicle when not in use.

The object of this invention is to provide simple and efficient means for the purpose, particularly adapted for use upon certain well-known makes of motor cars without change in their standard construction, and which means is so arranged as to firmly hold the pump against longitudinal or rotative movement in either direction in its support, whereby the pump is rigidly and detachably held in operative position with its shaft detachably connected with the engine shaft.

It is also an object of this invention to provide means whereby an extensible and contractible connection is provided between the pump shaft and the engine shaft to permit the pump to be turned upon a screw-threaded engagement with its support into frictional engagement therewith and put a pressure thereon to prevent the pump from turning in either direction when power is applied to its shaft from the engine shaft.

With these and other ends in view, the invention consists in the matters hereinafter set forth and more particularly pointed out in the appended claims, reference being had to the accompanying drawing in which Figure 1 is a side elevation of a pump, illustrating the same in operative position upon a motor vehicle, parts of the pump and its connecting and supporting means being broken away and in section to disclose the construction;

Figure 1:
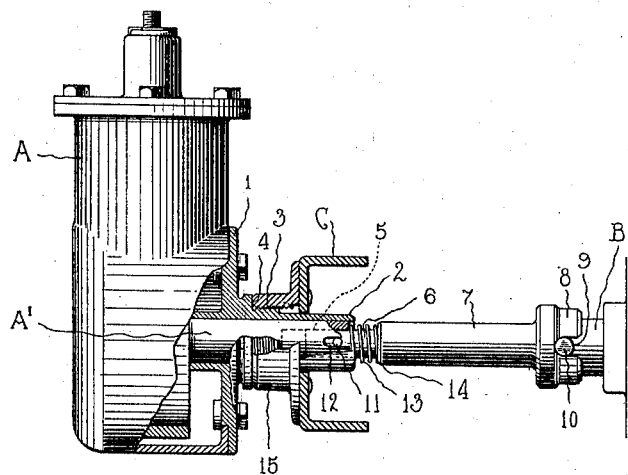
Figure 2:
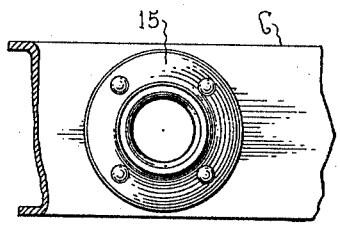
Fig. 2 is a front elevation of a portion of a cross member of a frame of a motor vehicle, showing a bearing support for the pump thereon.

The invention resides in the means for supporting the pump in operative position and connecting the crank shaft A′ of the pump A with the crank shaft B of the motor of a self-propelled vehicle. The pump casing is preferably provided with a detachable plate or cover 1 to close one side of its crank case, which cover is preferably formed with an extended tubular hub portion or collar 2 having a screw-threaded portion 3 with a shoulder 4 adjacent the end of the said screw-threaded portion. The tubular hub or collar 2 forms a bearing for the crank shaft A′ of the pump which shaft extends into and is substantially coextensive with said tubular hub or collar.

The pump shaft A′ is bored axially inward from its outer end a short distance as shown at 5, to receive the reduced end portion 6 of an extension or connecting member 7 having a clutch member or head 8 at its inner end provided with slots 9 to receive a cross pin 10 on the projecting end of the motor shaft B. The opposite or reduced outer end 6 of the member 7 is provided with a cross pin 11 to engage longitudinal slots 12 cut inwardly from the inner end of the crank shaft A′. The slot and pin connections between the ends of the member 7 and the pump shaft and engine shaft respectively, provide a loose longitudinally adjustable connection between the pump shaft and engine shaft, and to hold the connecting member 7 against free longitudinal play when the pump is in place and operatively connected with the engine shaft by the member 7, a coiled spring 13 is placed upon the reduced end portion 6 of the member 7 between the end of the pump shaft and the shoulder 14 formed on said member 7 by the reduced end portion.

As illustrated, a motor vehicle is provided with a frame cross member C having an opening therein substantially in alinement with the end of the engine shaft through which opening the usual starting crank may be inserted to engage the engine shaft and start the engine in case of emergency, or when the engine starter which is commonly provided on motor vehicles, fails to operate. A tubular member 15 is riveted or otherwise secured to the front face of the cross member C with its bore in axial alinement with the opening in said cross member and this tubular bushing or member 15 is internally screw-threaded to receive the screw-threaded portion 3 of the hub 2 on the pump casing.

When it is desired to place the pump in operative position upon the motor vehicle for the purpose of pumping up a tire or providing a supply of air for other purposes, the tubular hub or collar 2 is inserted through the member 15 and opening in the cross member C with the connecting member 7 connected with the inner end of the pump shaft A' and the clutch member 8 is thus brought into engagement with the end of the engine shaft. The screw threaded portion 3 of the pump hub is then engaged with the screw threads of the member 15 by turning the pump casing bodily until the shoulder 4 is brought up hard against the end face of the supporting member 15. This prevents the pump casing from turning bodily in either direction about the axis of its crank shaft when power is applied thereto from the engine shaft by the starting of the engine by means of a starter. The pump is thus rigidly supported upon the cross member C independently of the pump shaft and rigidly held against turning and against longitudinal movement in its support.

The turning of the pump casing until its shoulder 4 is brought into firm engagement with the end of the supporting member 15, when the clutch member 8 is fully engaged with the pin 10 on the end of the engine shaft, is permitted by the pin and slot connection between the outer end of the member 7 and the pump shaft, said pump shaft being thus free to move endwise a limited distance after the clutch member has engaged the pin 10. The spring 13 being interposed between the end of the pump shaft and the member 7, exerts a pressure to hold the clutch 8 engaged with the pin 10 and prevents endwise movement of the member 7 which would otherwise be free to take place due to the pin 11 being free to slide in the slot 12.

Figure 3:
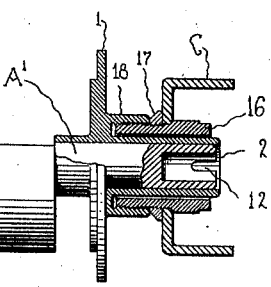
Fig. 3 is a sectional detail of a modified form of support for the pump and showing portions of the pump and the frame cross member in section.
Figure 4:
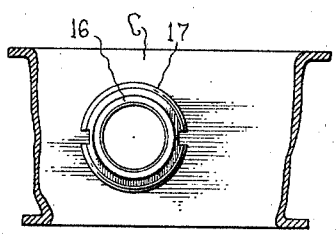
Fig. 4 is a front elevation of a portion of the frame cross member and the support shown in Fig. 3 applied thereto.

In Figs. 3 and 4 a tubular bushing or supporting member 16 is secured within the opening in the frame member C by providing a shoulder on the bushing to engage the inner side of the frame member and a nut 17 to engage the outer face thereof, the bushing being externally screw-threaded to receive the nut. The plate or cover 1 is formed with the tubular hub extension 2 as in the previously described construction and it is also formed with an annular flange 18 which is internally screw-threaded to engage the exterior of the outer end of the bushing 16 and thus form a tubular supporting member for the pump casing. This tubular supporting flange is concentric with the axis of the pump shaft and is thus adapted to rigidly support the pump with its crank shaft projecting through the supporting bushing 16 and with the tubular bearing therein out of contact with the bushing. The end face of the supporting flange is adapted to engage the nut 17 and thus prevent the pump casing from turning bodily in either direction.

Obviously, the screw-threaded member which forms the support for the pump casing may be attached to or be a part of some other member of the motor vehicle than the cross member C as shown, and it is also obvious that the member on the pump casing to engage said screw-threaded supporting member may be formed integral with the casing as shown or may be a separate part secured thereto. Other changes in the particular construction and arrangement of parts may also be made without departing from the spirit of the invention and I do not, therefore, limit myself to the particular form, construction or arrangement shown.

What I claim is:—

1. Means for detachably mounting a pump body on the front end of a motor vehicle with the pump shaft in alinement with and coupled to a motor shaft, said means comprising a fixed screw-threaded member on the vehicle substantially concentric with the axis of the engine shaft, a shaft bearing for the pump shaft rigid with the pump body, and a tubular supporting member into which the bearing projects and with respect to which the latter is non-rotatable, said supporting member being screw-threaded to engage the threads on the first mentioned threaded member, whereby the pump body is detachably supported and prevented from rotating in either direction in respect to the engine shaft.

2. Means for detachably mounting a pump body on the front end of a motor vehicle with the pump shaft in alinement with and coupled to a motor shaft, said means comprising a fixed threaded member on the vehicle, said member having an opening therethrough substantially concentric with the axis of the motor shaft and having threads substantially concentric to the opening, a shaft bearing for the pump shaft rigid with the pump body, said shaft projecting beyond the bearing and through the opening, and a tubular supporting member into which the bearing projects and with respect to which the latter is non-rotatable, said supporting member being threaded to engage the threads on the first mentioned threaded member.

3. Means for detachably mounting a pump body on the front cross bar of a motor vehicle with the pump shaft in alinement with and coupled to the engine shaft, said means comprising a screw-threaded member fixed to the cross bar, said pump body including a bearing for the pump shaft, a screw-threaded supporting member rigidly secured to the bearing, the threads of the last mentioned member being engaged with those of the fixed member, whereby the pump body is detachably supported and prevented from rotating in either direction in respect to the engine shaft.

4. Means for detachably mounting a pump upon a motor vehicle with its crank shaft substantially in alinement with and coupled to an engine shaft, said means comprising a fixed supporting member on the vehicle having an opening to receive the pump shaft and provided with a screw-thread, and a member rigidly carried by the pump and provided with a screw-thread concentric with the axis of the pump shaft to engage a screw-thread on the supporting member, said rigidly carried member and said supporting member having surfaces adapted to be brought into abutting relation by turning said members relatively in screw-threaded engagement, whereby the pump is rigidly and detachably supported and held against turning bodily in either direction about the axis of its shaft.

5. Means for detachably mounting a pump upon a motor vehicle comprising a motor shaft, a pump shaft, a rigid screw-threaded supporting member on the vehicle and a fixed screw-threaded member on the pump casing, said threads on each member being substantially concentric with the axis of the pump shaft, and means for loosely connecting the pump shaft to the motor shaft to permit an inward movement of the pump shaft after said means has been brought into engagement with the engine shaft.

6. Means for detachably mounting a pump upon a motor vehicle comprising a motor shaft, a pump shaft, a rigid supporting member on the vehicle, a rigid member on the pump to engage the supporting member and arranged to force the pump toward said member, and a loose connection between the pump shaft and the motor shaft to detachably connect the pump shaft and engine shaft.

7. Means for detachably mounting a pump upon a motor vehicle with its shaft detachably connected to the engine shaft of the vehicle, comprising a supporting member on the vehicle having a screw-threaded surface and a member on the pump having a thread to engage the screw-threaded surface and rigidly hold the pump body with the pump shaft in substantial alinement with an engine shaft on the vehicle and frictionally hold the pump.

8. Means for detachably mounting a pump upon a motor vehicle, comprising means for detachably connecting the pump shaft and a motor shaft on the vehicle, a rigid supporting member and a member on the pump to engage said supporting member, said members having interlocking means adapted to move said pump bodily in a direction longitudinally of its shaft, and said connecting means being adapted to permit a longitudinal contracting movement of said pump shaft relative to said engine shaft.

9. Means for detachably mounting a pump upon a motor vehicle with its shaft detachably connected to the engine shaft of said vehicle, comprising a rigid screw-threaded supporting member on the vehicle and a rigid screw threaded member on the pump to engage the supporting member, a connecting member to detachably engage the engine shaft, and means for loosely connecting said connecting member and said pump shaft to permit a relative longitudinal movement of said pump shaft and connecting member.

10. Means for detachably mounting a pump upon a motor vehicle with its shaft detachably connected to the engine shaft of said vehicle, comprising a screw-threaded supporting member and a member on the pump having a screw-thread concentric with the axis of the pump shaft to engage the screw-thread of the supporting member, a connecting member between the pump shaft and the engine shaft having a reduced end portion, the pump shaft being provided with a bore in its end to receive said reduced portion and also formed with a slot, and a pin on the reduced end portion of the connecting member to engage said slot.

11. Means for detachably mounting a pump upon a motor vehicle with its shaft detachably connected to the engine shaft of said vehicle, comprising a screw-threaded supporting member and a member on the pump having a screw-thread concentric with the axis of the pump shaft to engage the screw-thread of the supporting member, a connecting member having a clutch member at one end to detachably engage the engine shaft and a reduced end portion at its opposite end, said pump shaft being bored to receive said reduced end and slotted inwardly from said end, a pin on the reduced end portion to engage the slot, and a spring interposed between the end of the pump shaft and a shoulder on the connecting member formed by said reduced end portion.

12. In combination, a perforated front brace of the frame of a motor vehicle and an engine shaft extending longitudinally of said vehicle in alinement with the perforation in said brace, together with a detachable tire pump having a pump shaft in alinement with and coupled to the engine shaft, and a member projecting from the pump and arranged to engage the brace upon being moved rearwardly substantially parallel to the engine shaft, whereby the pump is prevented from rotating in both directions.

13. In combination with a fixed portion and a driven shaft of a motor vehicle and a detachable tire pump having a pump shaft in substantial alinement with and detachably coupled to the driven shaft, means for engaging the fixed portion of the vehicle to prevent rotation of the pump body in both directions in respect to the driven shaft, said means comprising a member that is brought into rotation preventing relation with the fixed portion by a movement otherwise than substantially at right angles to the axis of the driven shaft.

14. In combination with the engine shaft and with a fixed portion of a motor vehicle, said fixed portion including the front cross bar, a detachable tire pump having a pump shaft in substantial alinement with and detachably coupled to the engine shaft, means for preventing rotation of the pump body in respect to the engine shaft, said means including a single member arranged to engage the front cross bar and prevent rotation of the pump body in both directions.

In testimony whereof I affix my signature in the presence of two witnesses.

SILAS A. STRICKLAND.

Witnesses:
ANNA M. DORR,
C. R. STICKNEY.

Copies of this patent may be obtained for five cents each, by addressing the "Commissioner of Patents, Washington, D. C."